United States Patent [19]
Clark

[11] Patent Number: 6,128,408
[45] Date of Patent: Oct. 3, 2000

[54] METHOD FOR AUGMENTING SUM-OF-LAPLACIANS IN LIGHT AND DARK AREAS OF HALFTONE FIELD TO MAINTAIN RELIABLE SEGMENTATION

[75] Inventor: Raymond J. Clark, Webster, N.Y.

[73] Assignee: Xerox Corporation, Stamford, Conn.

[21] Appl. No.: 09/159,414

[22] Filed: Sep. 23, 1998

[51] Int. Cl.$^7$ ..................................................... G06K 9/34
[52] U.S. Cl. ........................................... 382/173; 382/224
[58] Field of Search ................................... 382/164, 165, 382/173, 176, 180, 224, 272

[56] References Cited

U.S. PATENT DOCUMENTS

| | | | |
|---|---|---|---|
| 5,073,953 | 12/1991 | Westdijk | 382/176 |
| 5,293,430 | 3/1994 | Shiau et al. | |
| 5,339,172 | 8/1994 | Robinson | 358/462 |
| 5,987,221 | 11/1999 | Bearss et al. | 382/176 |

Primary Examiner—Phuoc Tran
Attorney, Agent, or Firm—Fay, Sharpe, Fagan, Minnich & McKee, LLP

[57] ABSTRACT

A method and apparatus are disclosed which analyze the video surrounding a pixel being classified and augment a calculated absolute value of the sum of the laplacians Sij just enough to enable reliable document type detection based on the other microclassifiers. The augmentation in effect removes Sij's contribution to the document-type decision to an extent which varies with the video. Where the Sij calculation is expected to be robust, augmentation is small and Sij remains a factor. Where the Sij calculation is weak, augmentation is larger and the other microclassifiers used for halftone detection dominate the classification decision. The method generally includes the steps of determining an Sij value for the pixel being classified, determining an estimated substrate reflectance value, determining an estimated ink reflectance value, determining a local average video value, and augmenting the Sij value based on the lesser of 1) a difference between the substrate reflectance value and the local average video value, and 2) a difference between the ink reflectance value and the local average video value.

20 Claims, 4 Drawing Sheets

METHOD FOR AUGMENTING SUM-OF-LAPLACIANS IN LIGHT AND DARK AREAS OF HALFTONE FIELD TO MAINTAIN RELIABLE SEGMENTATION

BACKGROUND OF THE INVENTION

The present invention relates to the document processing system art. It finds particular application in conjunction with image segmentation, and more particularly a method for augmenting sum-of-laplacians in light and dark areas of halftone field to maintain reliable image segmentation. However, it should be appreciated that the present invention may also find application in conjunction with other types of digital imaging systems and applications that discern how an image was rendered.

Document processing systems often need to take an image representation with a low level of organizational structure, such as a simple bit or byte per pixel rectangular video map, and infer structure to guide further processing or analysis of the image. For example, in a reprographic system a document is optically scanned and the reflectance of each pixel is converted to an 8 bit digital value, forming an 8 bit per pixel matrix of integers representing the original document. Various image processing is then performed to enhance the image and convert it to a different resolution and form which can be rendered by a particular marking technology, such as a bi-level Xerographic printer. The purpose of the processing is to produce an output copy which appears to the human eye to be equal to or in some sense better than the original. Unfortunately, the appropriate image processing is different for different types of input documents, typical broad classes being text, continuous tone, and halftones of various techniques and frequencies.

Furthermore, many user originals contain more than one document type in different areas of the page, for example a magazine article with inset halftoned photographs, or text embedded in a tinted background. This explains the need to classify each document pixel, so that appropriate processing can be performed. In other applications, the pixel classification determined may be simply communicated to a subsequent process which analyzes the pixel level classification map further.

Algorithms for classifying image pixels according to document type (e.g. text, contone, halftone) make their decision based on image context in the vicinity of the pixel being classified. In the case of a halftoned document type, one of the most reliable microclassifiers used to detect the presence of a halftone is the absolute value of the sum of the laplacians in a small area surrounding the pixel being classified (abbreviated Sij). Unfortunately, Sij diminishes in light and dark regions, resulting in non-detection of halftone, and subsequent incorrect choice of image processing and rendering. This results in moire and artifacts due to inappropriate switching between rendering schemes on the output document.

Historically, Sij is calculated in the same way over an entire image, independent of video content, and factored into the halftone detection algorithm. In general, Sij values are very large for halftone areas of an image compared to contone areas, meaning that there is large latitude in how Sij is utilized by a detection algorithm. The exception to this generalization is that Sij diminishes in light and dark regions, resulting in non-detection of halftone, and subsequent incorrect choice of image processing and rendering.

In the past these defects were not visible because the use of hysteresis or other state-based methods, and rectangular segmentation blocks over which statistics were accumulated suppressed such errors, as did rendering TRCs designed to hide shortfalls not only in segmentation but in other parts of the system as well, such as the scanner. This was especially true in the dark areas of an image, where small errors in the video from the scanner are easily visible.

Recent advances in scanner technology and image segmentation, driven by the desire to more faithfully reproduce the original image, have eliminated the state based methods and the use of rectangular segmentation blocks. TRCs no longer saturate in the dark and light areas to hide flaws in the system, but are designed to faithfully render the original document at all densities. The new segmentation schemes, while avoiding the generation of rectangular artifacts, classify each pixel independently, precluding the possibility of neighborhood classification statistics overriding a given pixel's erroneous classification and thereby hiding errors.

To understand why Sij diminishes in dark and light areas of an image, it is observed that a halftone pattern is comprised of a matrix of halftone cells with each cell having either a white or black background (depending on whether it is greater or less than about 50% reflectance) and a round dot of the opposite color in the middle. Each individual 3×3 laplacian will be zero over a uniform field, and large when straddling an edge, such as the edge of the halftone dot. Therefore, an areal sum of the laplacians over a few halftone cells would be expected to be roughly proportional to the total halftone dot edge length, that is the sum of the circumferences of the halftone dots. This is borne out by plotting Sij versus reflectance for different halftone frequencies, and noting that the plots are very similar regardless of halftone frequency. An exemplary Sij versus reflectance plot for a 65 LPI halftone screen frequency is shown in FIG. 1. The reflectance is represented as a video gray level with 0 indicating zero reflectance or white, and 255 indicating 100% reflectance or black.

Previously, an Sij threshold of about 170 was successfully used to classify image areas as halftone. Looking at FIG. 1, it is easy to see why this produced satisfactory results, except in the very lightest and darkest areas. Sij is almost universally greater than 170, regardless of average density or halftone frequency. Sijs over plain white paper or contone images are typically in the range of 90–130, leaving a comfortable separation between halftone and contone or background areas of an image. However, a diminished Sij in light and dark regions results in non-detection of halftone fields, and subsequent incorrect choice of image processing and rendering.

Accordingly, it has been considered desirable to develop a new and improved method for augmenting sum-of-laplacians in light and dark areas of halftone fields to maintain reliable segmentation which meets the above-stated needs and overcomes the foregoing difficulties and others while providing better and more advantageous results.

SUMMARY OF THE INVENTION

The present invention analyzes the video surrounding the pixel being classified and augments the calculated Sij value just enough to enable reliable detection based on the other microclassifiers. This augmentation in effect removes Sij's contribution to the decision to an extent which varies with the video. Where the Sij calculation is expected to be robust, augmentation is small and Sij remains a factor. Where the Sij calculation is weak, augmentation is larger and the other microclassifiers used for halftone detection dominate the classification decision. This results in the best decision given the available information.

In accordance with one aspect of the present invention, a method for classifying a pixel of image data as one of a plurality of image types is disclosed. The method includes the steps of (a) determining a first image characteristic value for the pixel being classified, (b) determining a substrate reflectance value of an input document associated with the image data, (c) determining a ink reflectance value of the input document associated with the image data, (d) determining a local video value, and (e) augmenting the first image characteristic value based on the lesser of 1) a difference between the substrate reflectance value and the local video value, and 2) a difference between the ink reflectance value and the local video value.

In accordance with another aspect of the present invention, a method for classifying a pixel of image data as one of a plurality of image types is disclosed. The method includes the steps of (a) determining a first image characteristic value of the pixel being classified, (b) determining a second image characteristic value of the pixel being classified, (c) determining a substrate reflectance value of an input document associated with the image data, (d) determining a ink reflectance value of the input document associated with the image data, (e) determining a local video value, (f) assigning an image type classification to the pixel being classified based on the first image characteristic value and the second image characteristic value when a difference between the local video value and the substrate reflectance value is above a threshold value or a difference between the local video value and the ink reflectance value is above the threshold value, and (g) assigning an image type classification to the pixel based on the second image characteristic value when a difference between the local video value and the substrate reflectance value is below the threshold value or a difference between the local video value and the ink reflectance value is below the threshold value.

In accordance with yet another aspect of the present invention, a system for rendering a pixel of image data according to one of a plurality of image types is disclosed. The system includes a mechanism for determining a first image characteristic value of the pixel being classified, a mechanism for determining a substrate reflectance value of an input document associated with the image data, a mechanism for determining an estimated ink reflectance value of the input document associated with the image data, a mechanism for determining a local video value, a mechanism for augmenting the first image characteristic value based on the lesser of 1) a difference between the substrate reflectance value and the local video value, and 2) a difference between the ink reflectance value and the local video value, a classification mechanism for assigning an image type classification to the pixel based on a plurality of image characteristic values, and a processing mechanism for image processing the pixel based on the image type classification of the pixel.

One advantage of the present invention is the provision of a method and apparatus augmenting a microclassifier in the very light and very dark areas of a halftone field in order to maintain reliable image segmentation.

Another advantage of the present invention is the provision of a method and apparatus for distinguishing between very light and dark halftone document types and continuous tone document types.

Yet another advantage of the present invention is the provision of a method and apparatus for more faithfully reproducing a compound input document.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE PREFERRED EMBODIMENT(S)

Figure 1:
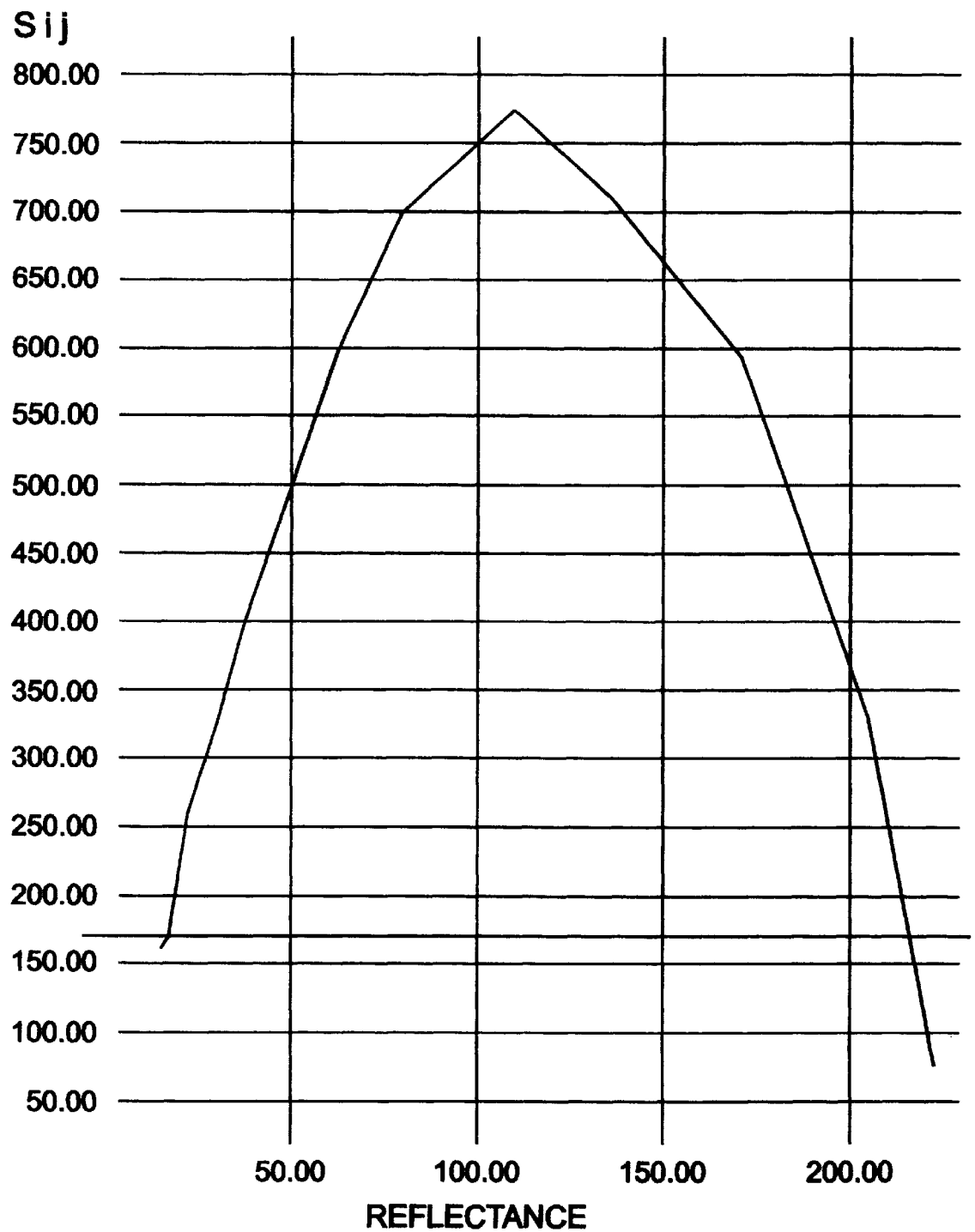
FIG. 1 is a graph illustrating $S_{ij}$ versus reflectance for a halftone with a 65 LPI screen frequency.

The following will be a detailed description of the drawings illustrated in the present invention. In this description, the terms "image data" or "pixels" in the form of video image signals, which may be either analog or digital voltage representations of an image, indicate a representation of an image provided from a suitable source. For example, the image signals may be obtained through line by line scanning of an image bearing the original by one or more photosensitive elements, such as an array of charge couple devices commonly referred to as CCDs. Line by line scanning of an image bearing the original for the duration of image data is well known and does not form a part of the present invention.

Image data may also be derived by a computer workstation program in accordance with document creation application software or from a data storage device. In content, the original video image signals may be composed entirely of a single image component such as lines, text, low frequency halftones, high frequency halftones, contones, or any combination thereof.

The following description also includes references to slowscan and fastscan digital image data when discussing the directionality of two-dimensional filtering architecture. For purposes of clarification, fastscan data is intended to refer to individual pixels located in a succession along a raster of image information, while slowscan data refers to data derived from a common raster position across multiple rasters or scanlines.

As an example, slowscan data would be used to describe signals captured from a plurality of elements along a linear photosensitive array as array is moved relative to a document. On the other hand, fastscan data would refer to the sequential signals collected along the length of the linear photosensitive array during a single exposure period which is also commonly referred to as a raster of data.

Moreover, in describing the present invention, it is assumed that the video signal has a value in a range between 0 and 255. However, any range from the video signal can be utilized in conjunction with the present invention. Furthermore, in the following description, the term "grey level" will be used to describe both black and white and color applications.

Furthermore, in describing the present invention, the term "pixel" will be utilized. This term may refer to an electrical, (or optical, if fiber optics are used), signal which represents the physical measurable optical properties at a physical definable area on a receiving medium. The receiving medium can be any tangible document, photoreceptor, or marking material transfer medium.

Moreover, the term "pixel" may refer to an electrical, (or optical, if fiber optics are used), signal which represents the physically measurable optical properties at a physically definable area on the display medium. A plurality of the physically definable areas for both situations represent the physically measurable optical properties of an entire physical image to be rendered by either a material marking device, electrically or magnetic marking device, or optical display device.

Lastly, the term "pixel," in the scanning environment, may refer to an electrical, (or optical, if fiber optics are used), signal which represents physical optical property data generated from a signal photosensor cell when scanning a physical image so as to convert the physical optical properties of the physical image to an electronic or electrical representation. In other words, in this situation, a pixel is an electrical, (or optical), representation of the physical optical properties of a physical image measured at a physical definable area on a optical sensor. The term "pixel," in the rendering environment, may refer to an electrical, (or optical, if fiber optics are used), signal which represents the smallest physical area on a recording substrate that can be rendered. In other words, in this situation, a pixel is an electrical, (or optical), representation of the physical spot created by a laser in a laser printed or the physical spot created by the smallest rendered ink droplet.

Many of the documents produced today are compound documents in that the documents are composed of several different sub-images that are of different image types or image classes. Some of the common types are text, photos (contones), and halftones. One reason for the increased appearance of compound documents is the widespread use of commercially available word processing and desktop publishing software that is able to generate them.

As is well known, different types of images require different processing in order to provide optimal image quality. Conventionally, to automatically choose the best processing for different areas of an image, each area is classified into one of several pre-defined classes to determine how to render that part of the image. This image type or image class information can then be used to determine the appropriate processing required to obtain a good rendition of the image when printing, to choose a method of image compression, to determine if optical character recognition would be useful, etc.

Figure 2:
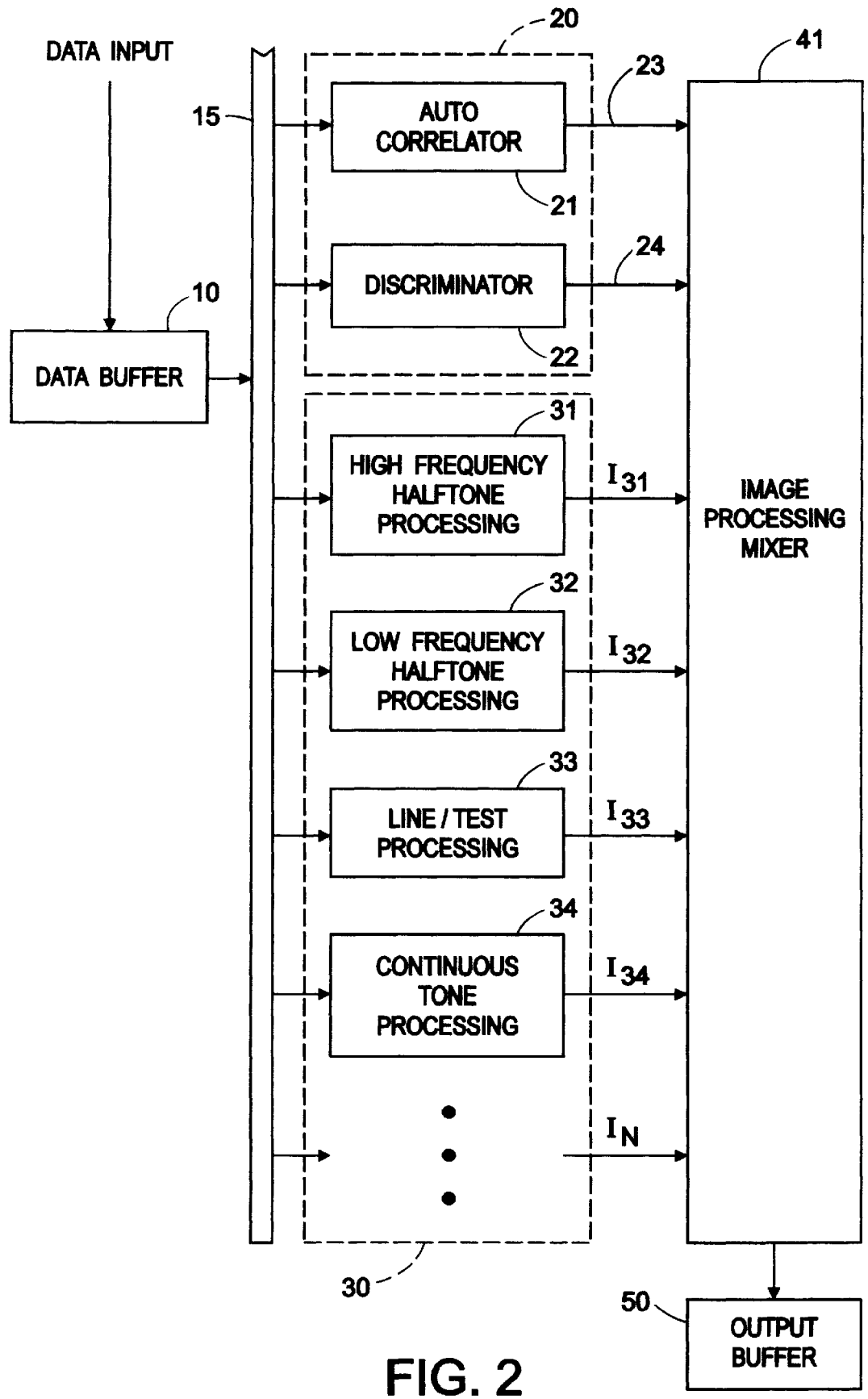
FIG. 2 is a block diagram illustrating an exemplary image processing system.

An exemplary automatic segmentation circuit 8 is illustrated in FIG. 2. The circuit 8 is made up of three modules. Image data stored in a data buffer 10 is simultaneously directed to an image property classifying section 20, the first module, and an image processing section 30, the second module, via a data bus 15. The image data is in its raw grey format, for example 6–8 bits per pixel, and is transferred in blocks of about 16 pixels at a time at 400 spots per inch (SPI), or 12 pixels at a time at 300 SPI.

The image data can be derived from any number of sources, including a raster input scanner, a graphics workstation, an electronic memory, or other storage element, etc. The data buffer 10 can be any suitable commercially available serial in/serial out multi-row buffer having a bit storage capacity sufficient to temporarily store lines of image pixels.

The image property classifying section 20, can include a number of submodules such as a halftone detector (e.g. autocorrelator 21), line/continuous tone detector (e.g. discriminator 22), etc. that determine whether a block of image pixels stored in the data buffer 10 is one type of imagery or another, (e.g. halftone, line/text, contone, etc.).

In parallel with the image property classifying section 20, the image processing section 30 is made up of any number of sub-processing sections, (e.g. high frequency halftone processor 31, low frequency halftone processor 32, line/text processor 33, or contone processor 34), which perform image processing operations on the same block of image pixels as section 20.

Each image sub-processing section performs image processing operations that are adapted to improve the image quality of a distinct class of imagery. The third module, control section 41, uses the information derived from the image classifying section 20, to control the image processing section 30. In other words, the control section 41 acts like a multiplexer and selects the proper processed image data according to the image classification determined by the image classifying section 20.

The decision as to what class of imagery image data belongs to is typically binary in nature. For example, in a conventional image segmentation scheme, image property classifying section 20 classifies image data as one of a number of classes of imagery (e.g. high-frequency halftone, mid-frequency halftone, low-frequency halftone, line/text, contone, etc.). The image data is then processed according to the properties of the class of imagery that was selected (e.g. low-pass filter and re-screening if it's a high-frequency halftone, threshold with a random threshold if it is a low-frequency halftone, etc.).

Consequently, the control section 41 decides the type of image processing the image data requires depending on the decision made by the classification section 20. Thus, the output of classification section 20 is quantized to one of a number of different document types. The control section 41 selects the output from one of the image sub-processing sections based upon this classification.

The image property classifying section 20 utilizes a pixel-by-pixel classification process wherein each pixel is individually classified based on a context of surrounding pixels or, more particularly, the pixel values in a neighborhood of pixels surrounding the pixel to be classified. Although it is desirable for the pixel to be centered, it is not necessary. For example, the pixel being classified could be located in the lower right of the context.

In a pixel-by-pixel implementation a neighborhood or window of pixels moves along the fastscan direction one pixel at a time and along the slowscan direction one scanline at a time. In contrast, a tiled window implementation moves along the fastscan direction to the next adjoining non-overlapping neighborhood or window of pixels and moves along the slowscan direction to the next adjoining non-overlapping window of pixels.

The image property classifying section 20 measures, calculates, or otherwise determines intrinsic properties (e.g. microclassifiers) of the video extracted through a simple mathematical formula or heuristic. The microclassifiers have different values (e.g. magnitudes) when computed for images of different types. The values of one or more of the microclassifiers are then analyzed to classify the image pixel according to document type.

To characterize continuous tone verses halftone document types, a measure of energy or variation of the video is computed. In this implementation, the Laplacian of the video is first computed from Equation 1 as follows:

$$L_{i,j}=(V_{i-1,j-1}+V_{i-1,j}+V_{i-1,j+1}+V_{i,j-1}+V_{i,j+1}+V_{i+1,j-1}+V_{i+1,j}+V_{i+1,j+1})/8-V_{i,j} \quad \text{(Eq. 1)},$$

where Vij is the video of the j-th pixel in the i-th scanline, and Lij is the Laplacian of the video at the j-th pixel in the i-th scanline.

More specifically, the Laplacian Lij is simply the difference between the pixel being classified Vij and the average of its eight neighbors. After computing the Laplacian Lij, the absolute value of the sum of the laplacians Sij over a small neighborhood of $N_x$ pixels by $N_y$ scanlines surrounding the pixel of interest is computed. The Sij operator provides a measure of activity, or energy, within its context region. The parameter $N_x$ is typically chosen to be 7 for a 400 spot per inch image and 11 for a 600 spot per inch image, and the parameter $N_y$ is typically chosen to be 3 for a 400 spot per inch image and 5 for a 600 spot per inch image. However, the size of the area used to determine Sij can vary such as a 5×9, 7×13, etc. context.

A pixel can be classified as, for example, a contone document type or a halftone document type depending, in part, upon the calculated value of Sij. Generally, as shown in FIG. 1, a larger Sij value (about 170 or greater) is indicative of a halftone document type, while a smaller Sij value (less than about 170) is indicative of a contone document type. However, as mentioned above, the exception to this generalization is that Sij's ability to detect a halftone document type diminishes in light and dark regions resulting in non-detection of the halftone document type and subsequent incorrect choice of image processing and rendering.

The calculated Sij operator can be augmented in the dark and light areas of an image in order to raise the calculated Sij value above the halftone detection threshold. For instance, given a background Sij of 90, an augmentation of 80 effectively eliminates Sij as a factor in classifying an image as halftone, leaving the decision up to other factors (i.e. microclassifiers), such as estimated halftone frequency. Augmentation of Sij is limited to the areas of the document where it is needed (i.e. the light and dark areas) so that a legitimately weak Sij in the midtones can disqualify a pixel from being classified as halftone.

It is preferable to augment inversely with halftone spot circumference. However, halftone spot circumference information is not available. But circumference is related to spot area, and spot area is related to average reflectance. Because spot area is related to the square of circumference, use of reflectance has the wrong form, but it is easier and cheaper to derive a linear function in hardware than a quadratic one. Furthermore, as can be seen from FIG. 1, augmentation is only needed in the very dark and very light areas of the document. Thus, over this narrow range (i.e. below an Sij level of 170) a linear approximation very closely follows the Sij curve.

Reflectance as delivered by the scanner is not quite the quantity needed because the size of the halftone spots cause the reflectance to vary not relative to 100%, but relative to the reflectance of the document substrate. Similarly, in the dark areas of an image, the white spots can be assumed to have just appeared as the scanner output deviates from the foreground ink reflectance, not from an ideal 0%. For this reason, the distance of the current video value (i.e. reflectance) from the system's current estimate of the white background or black foreground level, whichever is less, is used to scale the augmentation.

The average video level over the same area used to calculate Sij can be used to scale the level of Sij augmentation. However, because the area over which Sij is calculated can be large (e.g. 5×9 to 7×13), it can be expensive to implement a full average over the same size area. In practice, the video level of the single pixel being classified works adequately for the purpose of suppressing artifacts caused by pixel misclassification with specific rendering techniques. However, the average video level of a small matrix (e.g. 3×3) centered on the pixel to be determined works even better. The pixel average of a 3×3 matrix can be determined in any number of ways. For instance, the pixels above and below the central pixel can be weighted only ½ with the remaining pixels weighted one so that the sum is eight, as opposed to nine. Thus, the pixel average of the 3×3 matrix can be determined by simply dropping the lower three bits.

Figure 3:
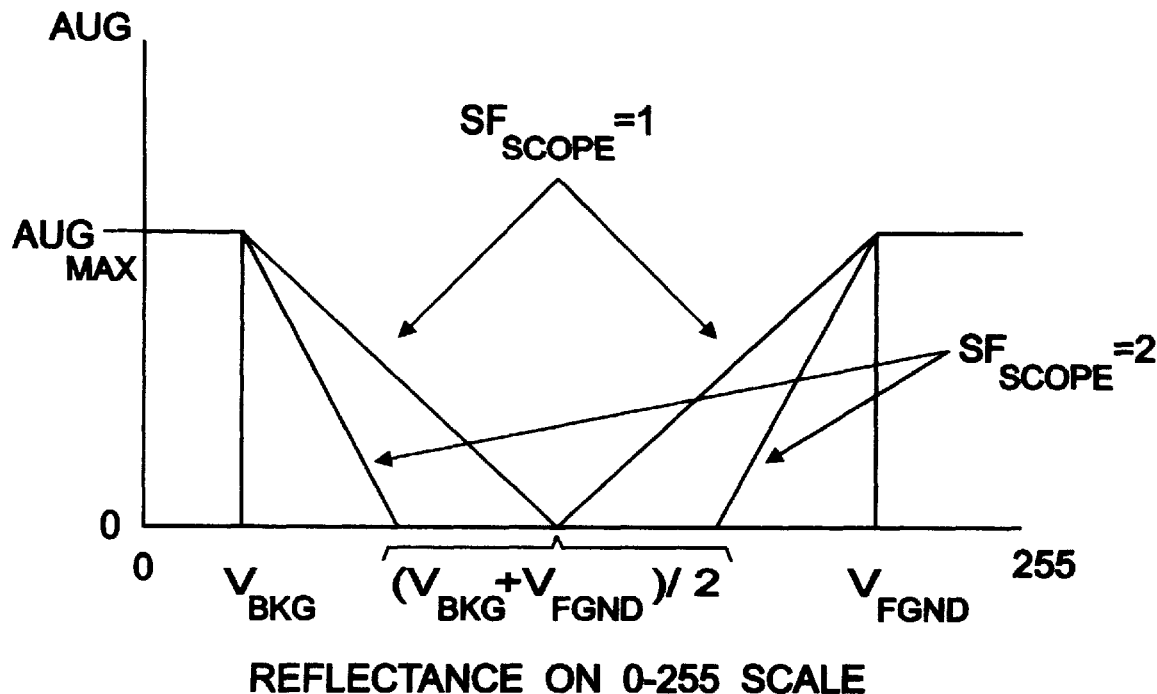
FIG. 3 illustrates two $S_{ij}$ augmentation curves, one for Scale=1, and one for Scale=2.

The level of Sij augmentation can be determined from the following equations which, as shown in FIG. 3, generate a family of augmentation curves depending on the values of the user-selected parameters $SF_{SCOPE}$ and $AUG_{MAX}$:

$$Distance=min((V_{AVG}-V_{FGND}), (V_{BKG}-V_{AVG})) \quad \text{(Eq. 2)},$$

$$SF_{DOCDR}=(V_{MAX}-V_{MIN})/(V_{BKG}-V_{AVG}) \quad \text{(Eq. 3)},$$

$$SF_{AUGMAX}=AUG_{MAX}/((V_{MAX}-V_{MIN})/2 \quad \text{(Eq. 4)},$$

$$Scale_{NET}=SF_{DOCDR}+SF_{AUGMAX}+SF_{SCOPE} \quad \text{(Eq. 5)},$$

$$AUG=AUG_{MAX}-(Distance*Scale_{NET}) \quad \text{(Eq. 6)},$$

where $V_{MIN}$ is the minimum system video value (e.g. 0 for an 8-bit system); $V_{MAX}$ is the maximum system video value (e.g. 255 for an 8-bit system); $V_{AVG}$ is a simple video average of a context (e.g. 3×3) centered at the pixel being classified; $V_{BKG}$ is the system's current estimate of the substrate reflectance (background); $V_{FGND}$ is the system's current estimate of the ink reflectance (foreground); Distance is the distance of $V_{AVG}$ from $V_{BKG}$ or distance of $V_{AVG}$ from $V_{FGND}$, whichever is less; $SF_{DOCDR}$ is the scale factor driven by document dynamic range; $AUG_{MAX}$ is the maximum Sij augmentation to be applied at $V_{BKG}$ or $V_{FGND}$; $SF_{AUGMAX}$ is the scale factor driven by $AUG_{MAX}$; $SF_{SCOPE}$ is the scale factor driven by the desired scope of reflectance over which augmentation will occur; $Scale_{NET}$ is the net scale factor to apply to Distance to arrive at AUG; and AUG is the final amount by which Sij is to be augmented.

The subtraction operations in equations 2 and 6 are clamped to zero to prevent negative results. It is necessary to clamp the result of Equation 2 to zero in order to avoid having large augmentations in regions where the reflectance is greater than $V_{BKG}$ or less than $V_{FGND}$, which could result in inappropriate halftone detection where there is no valid image. Because of the distances necessary, this would show up when $SF_{SCOPE}$ was large and/or $V_{BKG}$ and $V_{FGND}$ are not at extreme values, e.g. creme paper with grey ink.

It is contemplated that eliminating the clamp to zero for the Equation 6 subtraction operations would in fact result in an Sij comparison which is flatter across the full range of reflectance by not only augmenting in the dark and light regions, but also reducing Sij in the midtone regions, demanding a stronger Sij where Sij should be very strong if the candidate video is in fact a halftone pattern.

The narrower the reflectance range between $V_{BKG}$ and $V_{FGND}$, the narrower the dynamic range of the input document, and the steeper the slope of the augmentation curve must be in order to intersect the zero augmentation point located halfway between $V_{BKG}$ and $V_{FGND}$. The scale factor $SF_{DOCDR}$ is inversely proportional to the dynamic range of the input document. In addition, the greater the maximum level of augmentation $AUG_{MAX}$, the steeper the slope of the augmentation curve must be in order to intersect the zero augmentation point located halfway between $V_{BKG}$ and $V_{FGND}$. The scale factor $SF_{AUGMAX}$ is directly proportional to maximum augmentation level $AUG_{MAX}$.

Figure 4:
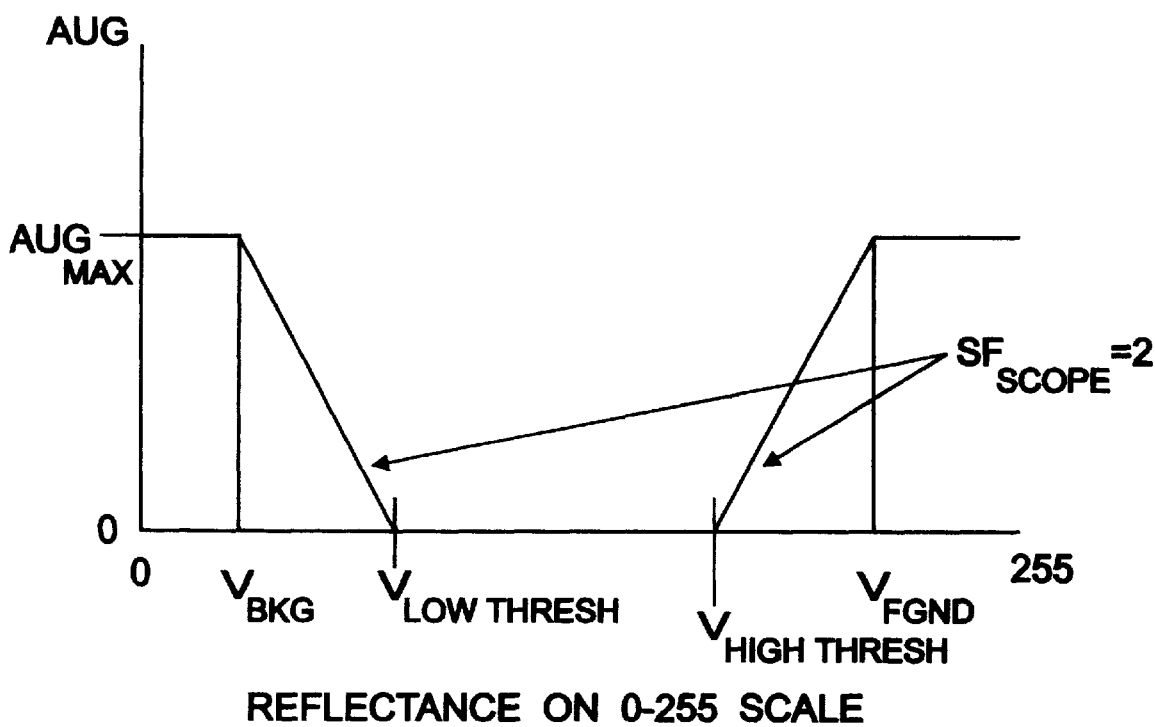
FIG. 4 illustrates a further $S_{ij}$ augmentation curve for Scale=2.

In effect, Equation 2 generates the degree to which the potential halftone pattern is either dark or light (it does not matter which since dark areas and light areas are processed the same). To the extent to which the potential halftone pattern is dark or light, Sij will be weak and so a poor microclassifier with which to judge the video with respect to presence of a halftone pattern. Referring to FIG. 4, in effect the selection of $SF_{SCOPE}$ in conjunction with the other parameters determines thresholds above which ($V_{HIGHTHRESH}$) and below which ($V_{LOWTHRESH}$) augmentation will take place. FIGS. 3 and 4 illustrate how the augmentation is varied with the position of $V_{AVG}$ between $V_{BKG}$ and $V_{LOWTHRESH}$ in the dark areas, or $V_{HIGHTHRESH}$ and $V_{FGND}$ in the light areas.

An alternate way to prevent low Sij at the extremes from inhibiting halftone detection in light and dark areas would be to simply remove it from the classification equation where the distance between VAVG and VBKG or between VAVG and $V_{FGND}$ is less than a predetermined threshold. For example, where there now might be a classification test of the form:

If (microclassifier1>t1 and microclassifier2<t2 . . . and Sij>tN)

Then classification=halftone

One might instead have:

If (microclassifier1>t1 and microclassifier2<t2 . . . and (Sij>tN or distance<tM))

Then classification=halftone

Given the curve of FIG. 1, it is clear that a very aggressive $SF_{SCOPE}$ value greater than one, such as 4, or even 8, is best so as to limit augmentation to the very dark or very light regions. As shown in FIG. 3, too low of a scale factor (e.g. Scale=1.0) results in Sij being augmented in the mid tones where augmentation is not needed. This in effect dilutes or eliminates Sij's ability to disqualify pixels from being a halftone, leaving the decision to other microclassifiers (i.e. estimated halftone frequency).

If $AUG_{MAX}$ is set to the minimum value necessary to eliminate artifacts due to failure to classify dark and light halftones, there is little penalty for choosing $SF_{SCOPE}$ to be too small a number; in fact a value of 1 has been used with good results even though a value of 4–8 would be more optimal. On the other hand, a larger value of $SF_{SCOPE}$ which approaches the ideal value causes the system to be sensitive to inaccurate estimates of $V_{BKG}$ and $V_{FGND}$, and too large a value for $SF_{SCOPE}$ results in a segment of reflectance space where the video is augmented insufficiently. $SF_{SCOPE}$ should be chosen to place $V_{LOWTHRESH}$ and $V_{HIGHTHRESH}$ at the optimal value plus or minus $V_{BKG}$ and $V_{FGND}$ maximum error respectively.

As with the $SF_{SCOPE}$ value, the optimum value of $AUG_{MAX}$ has been found to fall within a range of about 70 to about 90. Empirically, an $AUG_{MAX}$ level of about 70 is sufficient to make most of the misclassification driven rendering artifacts (such as moire) invisible simply because it is not necessary to remove the entire population of incorrectly classified pixels, just most of them. A value of about 90 provides some margin while minimizing the impact to known segmentation schemes.

Figure 5:
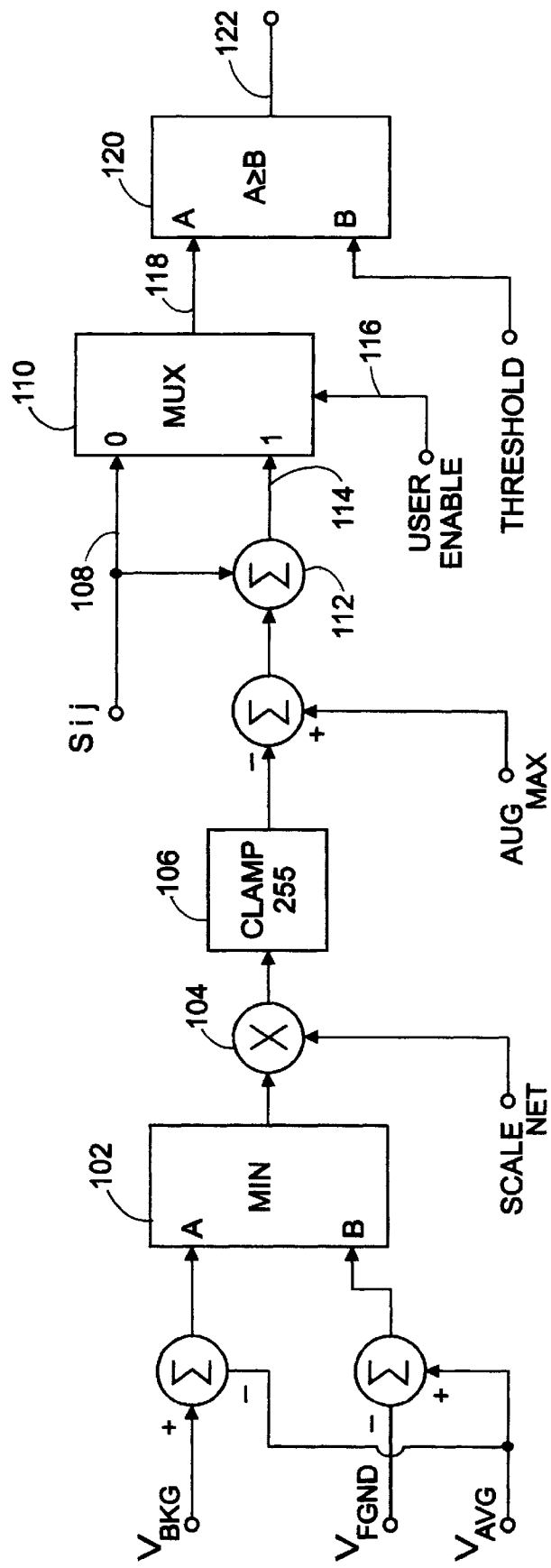
FIG. 5 illustrates an $S_{ij}$ determination module of image processing system of FIG. 2.

The present method of augmenting Sij in light and dark areas of an input image can be implemented in hardware, software, firmware, or any combination thereof. For instance, referring to FIG. 5, there is shown an exemplary Sij determination module 100 of the image property classifying section 20. A comparator 102 compares the difference between 1) the current system estimate of the background reflectance value ($V_{BKG}$) and a local average reflectance value ($V_{AVG}$) at input A, with 2) the difference between the current system estimate of the foreground reflectance value ($V_{FGND}$) and the local average reflectance value ($V_{AVG}$) at input B. The output MIN of the comparator 102 is indicative of distance that current video value ($V_{AVG}$) is from the system's current estimate of the white background or black foreground level, whichever is less.

The system estimate of the background reflectance value ($V_{BKG}$) and the foreground reflectance value ($V_{FGND}$) can be determined in any conventional manner. The local average reflectance value ($V_{AVG}$) can be determined from any size context of pixels such as a 3×3. Alternatively, the video value of the pixel being classified can be used as the local average reflectance value ($V_{AVG}$) (i.e. no averaging).

The output of the comparator 102 is multiplied by $Scale_{NET}$ at 104 and, if necessary, the result is clamped to the maximum video value $V_{MAX}$ (i.e. 255) at 106. The amount by which Sij is to be augmented is then determined by obtaining the difference between $AUG_{MAX}$ and the output of 106. The current Sij value is applied to a first input 108 of a multiplexor 110. The Sij value is also summed with the resulting augmentation value at 112 and applied to a second input 114 of the multiplexor 110.

A user-selectable enable signal at 116 controls whether the multiplexor 110 outputs the Sij value on input 108 or the augmented Sij value on input 114. The multiplexor output 118 is applied to an input A of a comparator 120. The Sij threshold value (e.g. 170) is applied to a second input B of the comparator 120. If the value on input A is greater than or equal to the value on input B, then the output 122 of the comparator 120 is driven high. If the value on input A is less than the value on input B, then the output 122 of the comparator 120 is driven low. The signal on the comparator output 122 is then used as one of many factors in determine if the pixel being classified is part of a halftone pattern.

In summary, the present invention analyzes the video surrounding the pixel being classified and augments the calculated Sij value just enough to enable reliable detection based on the other microclassifiers (e.g. estimated halftone frequency). This augmentation in effect removes Sij's contribution to the decision to an extent that varies with the current video level. Where the Sij calculation is expected to be robust, augmentation is small. Where Sij calculation is weaker, augmentation is larger and the other microclassifiers used for halftone detection dominate the classification decision.

Although the present invention has been described in detail above, various modifications can be implemented without departing from the spirit of the present invention. For example, the preferred embodiment of the present invention has been described with respect to a xerographic printing system; however, the present invention is readily implemented in a thermal inkjet system, a display system, or other image processing system.

Further, in the embodiment being described, the augmentation value AUG is added to the calculated Sij value at 112. Alternatively, it is contemplated that the threshold against which the calculated Sij value is compared at 120 can be reduced by the calculated augmentation value. This is mathematically equivalent, and might be easier to implement.

Moreover, the image processing system of the present invention can be readily implemented on a general purpose computer, a personal computer or workstation. The image processing system of the present invention can be readily implemented on an ASIC, thereby enabling the placement of this process in a scanner, electronic subsystem, printer, or display device.

The present invention has been described with respect to a video range of 0 to 255. However, it is contemplated by the present invention that the video range can be any suitable range to describe the grey level of the pixel being processed. Furthermore, the present invention is readily applicable to any image processing system, not necessarily a binary output device.

Lastly, the present invention has been described with respect to a monochrome or black/white environment. However, the concepts of the present invention are readily applicable to a color environment. Namely, the processing operations of the present invention can be applied to each color space value, some function of a given pixel's color space components, or even a function of the color space components of a pixel and other pixels in the neighborhood.

While the invention has been described with reference to a preferred embodiment, it is not confined to the details set forth above, but is intended to cover such modifications or changes as may come within the scope of the attached claims.

For instance, the invention has been described with reference to augmenting the Sij microclassifier in areas of reflectance where it is a weak predictor of document type. However, the present invention can be used to augment any microclassifier that is a weak predictor of document type. Further, invention has been described with reference to augmenting the Sij microclassifier in areas of reflectance based on an average local video value. However, the present invention can be used to augment any microclassifier based on any characteristic.

Having thus described the preferred embodiment(s), the invention is now claimed to be:

1. A method for classifying a pixel of image data as one of a plurality of image types, comprising the steps of:
   (a) determining a first image characteristic value for the pixel being classified;
   (b) determining a substrate reflectance value of an input document associated with the image data;
   (c) determining a ink reflectance value of the input document associated with the image data;
   (d) determining a local video value; and
   (e) augmenting the first image characteristic value based on the lesser of 1) a difference value between the substrate reflectance value and the local video value, and 2) a difference value between the ink reflectance value and the local video value.

2. The method of claim 1, wherein step (a) includes the step of:
   (f) determining an absolute value of the sum of the laplacians for the pixel being classified.

3. The method of claim 1, wherein the local video value is a video value for the pixel being classified.

4. The method of claim 1, the local video value is an average video value for a context of pixels centered on the pixel being classified.

5. The method of claim 1, wherein
   the greater the difference between the substrate reflectance value and the local video value, the lesser the first image characteristic value is augmented, and
   the greater the difference between the ink reflectance value and the local video value, the lesser the first image characteristic value is augmented.

6. The method of claim 1, wherein step (e) includes the step of:
   (f) augmenting the first image characteristic value to reduce its impact as a factor in classifying the pixel as a halftone document-type.

7. The method of claim 1, wherein step (e) includes the step of:
   (f) multiplying the lesser of 1) the difference between the substrate reflectance value and the local average video value, and 2) the difference between the ink reflectance value and the local average video value, by a scale factor to determine a level of augmentation.

8. The method of claim 7, wherein the scale factor is based on at least one of i) a scale factor $SF_{DOCDR}$ derived from a dynamic range of the input document, ii) a scale factor $SF_{AUGMAX}$ derived from a maximum augmentation value, and iii) a user-selected scale factor $SF_{SCOPE}$ which controls the scope in halftone apparent reflectance space over which augmentation will occur.

9. The method of claim 1, further including the steps of:
   (f) assigning an image type classification to the pixel based in part on a magnitude of the augmented first image characteristic value; and
   (g) processing the pixel based on the image type classification of the pixel.

10. The method of claim 1, wherein step (e) includes the step of:
   (f) clamping the difference value to zero to avoid augmenting the first image characteristic value when the local video value is greater than the substrate reflectance value or less than the ink reflectance value.

11. A method for classifying a pixel of image data as one of a plurality of image types, comprising the steps of:
   (a) determining a first image characteristic value of the pixel being classified;
   (b) determining a second image characteristic value of the pixel being classified;
   (c) determining a substrate reflectance value of an input document associated with the image data;
   (d) determining a ink reflectance value of the input document associated with the image data;
   (e) determining a local video value;
   (f) assigning an image type classification to the pixel being classified based on the first image characteristic value and the second image characteristic value when a difference between the local video value and the substrate reflectance value is above a threshold value or a difference between the local video value and the ink reflectance value is above the threshold value; and
   (g) assigning an image type classification to the pixel based on the second image characteristic value when a difference between the local video value and the substrate reflectance value is below the threshold value or a difference between the local video value and the ink reflectance value is below the threshold value.

12. The method of claim 11, wherein the first image characteristic value is an absolute value of the sum of the laplacians for the pixel being classified.

13. The method of claim 12, wherein the second image characteristic value is at least one of a plurality of microclassifiers used to identify a video region as a halftone pattern.

14. The method of claim 11, wherein the local video value is a video value for the pixel being classified.

15. The method of claim 11, wherein the local video value is the average video value of a context of pixels centered on the pixel being classified.

16. A system for rendering a pixel of image data according to one of a plurality of image types, comprising:

means for determining a first image characteristic value of the pixel being classified;

means for determining a substrate reflectance value of an input document associated with the image data;

means for determining an estimated ink reflectance value of the input document associated with the image data;

means for determining a local video value;

means for augmenting the first image characteristic value based on the lesser of 1) a difference between the substrate reflectance value and the local video value, and 2) a difference between the ink reflectance value and the local video value;

classification means for assigning an image type classification to the pixel based on a plurality of image characteristic values; and processing means for image processing the pixel based on the image type classification of the pixel.

17. The system of claim 16, further including printing means for rendering the image processed pixel.

18. The system of claim 16, wherein the first image characteristic value is an absolute value of the sum of the laplacians for the pixel being classified.

19. The system of claim 16, wherein the smaller the difference between the substrate reflectance value and the local video value, the greater the first image characteristic value is augmented, and the smaller the difference between the ink reflectance value and the local video value, the greater the first image characteristic value is augmented.

20. The system of claim 16, wherein the first image characteristic value is augmented to reduce its impact as a factor in assigning an image type classification to the pixel being classified.

* * * * *